(12) United States Patent
Liu et al.

(10) Patent No.: US 11,831,574 B2
(45) Date of Patent: Nov. 28, 2023

(54) METHOD AND APPARATUS FOR SENSING MEASUREMENT

(71) Applicant: HUAWEI TECHNOLOGIES CO., LTD., Guangdong (CN)

(72) Inventors: Chenchen Liu, Shenzhen (CN); Xiao Han, Shenzhen (CN); Rui Du, Shenzhen (CN); Meihong Zhang, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 17/692,292

(22) Filed: Mar. 11, 2022

(65) Prior Publication Data
US 2022/0200753 A1 Jun. 23, 2022

Related U.S. Application Data

(63) Continuation of application No. PCT/CN2020/114790, filed on Sep. 11, 2020.

(30) Foreign Application Priority Data

Sep. 12, 2019 (CN) .......................... 201910865373.8

(51) Int. Cl.
*H04L 5/00* (2006.01)
*H04L 25/02* (2006.01)

(52) U.S. Cl.
CPC .......... *H04L 5/0048* (2013.01); *H04L 5/0023* (2013.01); *H04L 5/0094* (2013.01); *H04L 25/0204* (2013.01)

(58) Field of Classification Search
CPC ... H04L 5/0023; H04L 5/0048; H04L 5/0094; H04L 25/0202; H04L 25/0204; H04L 25/0224; H04B 17/309
See application file for complete search history.

(56) References Cited

U.S. PATENT DOCUMENTS

| | | | |
|---|---|---|---|
| 2010/0104038 A1 | 4/2010 | Stager et al. | |
| 2011/0096797 A1* | 4/2011 | Zhang | H04B 7/0669 370/474 |

(Continued)

FOREIGN PATENT DOCUMENTS

| | | |
|---|---|---|
| CN | 101578831 A | 11/2009 |
| CN | 101764678 A | 6/2010 |
| CN | 103378893 A | 10/2013 |

OTHER PUBLICATIONS

Nokia et al., "Discussion on the MIMO channel model", 3GPP TSG RAN WG 1 Release '5 AdHoc, Espoo, Finland, Jun. 26-28, 2001, TSG R1-01-0702 total 33 pages.

(Continued)

*Primary Examiner* — David B Lugo

(57) ABSTRACT

This application provides a method and an apparatus for sensing measurement. In a technical solution of this application, a transmit end of data may send an indication frame to a receive end of the data, where the indication frame may indicate a spatial mapping matrix used by the transmit end of the data to send the data to the receive end of the data. In this way, the receive end of the data can eliminate impact of spatial mapping on channel state information based on the spatial mapping matrix, to obtain actual channel state information, thereby completing sensing, positioning, and the like on an ambient environment or a passive target by using the obtained actual channel state information.

21 Claims, 12 Drawing Sheets

(56) References Cited

U.S. PATENT DOCUMENTS

| | | | |
|---|---|---|---|
| 2012/0177018 A1 | 7/2012 | Abraham et al. | |
| 2014/0286238 A1* | 9/2014 | Erceg | H04W 80/00 |
| | | | 370/328 |
| 2020/0092142 A1* | 3/2020 | Sethi | H04L 25/0236 |
| 2020/0127719 A1* | 4/2020 | Lomayev | H04B 7/0639 |
| 2021/0288779 A1* | 9/2021 | Da Silva | H04L 5/0051 |
| 2022/0271800 A1* | 8/2022 | Handte | H04B 7/0413 |

OTHER PUBLICATIONS

International Search Report and Written Opinion issued in PCT/2020/114790, dated Dec. 10, 2020, 10 pages.

Riccardo Crepaldi et al: "CSI-SF: Estimating wireless channel state using CSI sampling and fusion", INFOCOM, 2012 Proceedings IEEE, Mar. 25, 2012, pp. 154-162, XP032178884, DOI: 10.1109/INFCOM.2012.6195523 ISBN: 978-1-4673-0773-4.

Antu Zhou et al: "Signpost : Scalable MU-MIMO Signaling with Zero CSIFeedback", Proceedings of the 16th ACM Internationalsymposium on Mobile Ad Hoc Networking and Computing,Mobihoc 15, Jan. 1, 2015, pp. 327-336, XP055437770, DOI:10.1145/2746285.2746286 ISBN: 978-1-4503-3489-1.

Vishal Gupta et al: "Bit-Stuffing in 802.11 Beacon Frame: Embedding Non-Standard Custom Information", International Journal of ComputerApplications (0975-8887), Feb. 1, 2013, pp. 6-12, XP055249512, Retrieved from the Internet: URL:http://research.ijcaonline.org/volume 63/number2/pxc3885115.pdf [retrieved on Feb. 11, 2016].

Bianchi Giuseppe et al: "Unveiling Access Point Signal Instability in WiFi Based Passive Sensing", 2017 26th International Conference on Computer Communication and Networks (ICCCN), IEEE, Jul. 31, 2017, pp. 1-9, XP033154018, DOI: 10.1109/ICCCN.2017.8038449 [retrieved on Sep. 14, 2017].

Extended European Search Report issued in EP20864208.2, dated Sep. 7, 2022, 13 pages.

Office Action issued in CN201910865373.8, dated Jun. 5, 2023, 6 pages.

* cited by examiner

| Trigger type | UL length | Subsequent trigger frame | Carrier sense | Uplink bandwidth | Guard interval and training sequence | Multi-user MIMO training sequence mode | Number of HE-LTFs and midamble symbol period |
|---|---|---|---|---|---|---|---|
| B0 B3 | B4 B15 | B16 | B17 | B18 B19 B20 B21 | B20 B21 | B22 | B23 B25 |
| Bit: 4 | 12 | 1 | 1 | 2 | 2 | 1 | 3 |

| Uplink space-time coding | LDPC additional symbol paragraph | AP transmit power | Fill factor before coding | Packet extension deblurring | Uplink spatial multiplexing | Doppler | UL HE-SIG-A2 reserved | Reserved field | Trigger type related common information |
|---|---|---|---|---|---|---|---|---|---|
| B26 | B27 | B28 B33 | B34 B35 | B36 | B37 B52 | B53 | B54 B62 | B63 | |
| Bit: 1 | 1 | 6 | 2 | 1 | 16 | 1 | 9 | 1 | Variable |

FIG. 7

| Frame control field | Duration | Receiver address | Transmitter address | Measurement dialog password | Station information 1 | ... | Station information n | Station information security control | Spatial mapping matrix field | Frame check sequence |
|---|---|---|---|---|---|---|---|---|---|---|
| Byte: 2 | 2 | 6 | 6 | 1 | 4 | | 4 | 4 | Variable | 4 |

FIG. 9

| Element ID | Length | Element ID extension | Sensing parameter | Sensing sub-element (spatial mapping matrix element) |
|---|---|---|---|---|
| 1 | 1 | 1 | 6 | Variable |

Byte

METHOD AND APPARATUS FOR SENSING MEASUREMENT

CROSS-REFERENCE TO RELATED APPLICATIONS

This application is a continuation of International Application No. PCT/CN2020/114790, filed on Sep. 11, 2020, which claims priority to Chinese Patent Application No. 201910865373.8, filed on Sep. 12, 2019. The disclosures of the aforementioned applications are hereby incorporated by reference in their entireties.

TECHNICAL FIELD

This application relates to the field of wireless communication, and more specifically, to a method and an apparatus for sensing measurement.

BACKGROUND

With advancement of science and technology, people are not satisfied with Wi-Fi being used only for communication, and further expect to perform sensing, positioning, and the like on an ambient environment or a passive target by using Wi-Fi signals. Currently, sensing and positioning on the ambient environment or the passive target are implemented mainly by analyzing a channel estimation result of a Wi-Fi system.

Currently, a transmit end device usually performs spatial mapping on space time stream data by using a spatial mapping technology. To be specific, $N_{STS}$ pieces of space time stream data on each subcarrier in an orthogonal frequency division multiplexing (OFDM) symbol are mapped onto $N_{TX}$ transmit links. The spatial mapping may be implemented by using a spatial mapping matrix ( ) whose size is $N_{TX} \times N_{STS}$. The spatial mapping matrix maps a complex vector whose length is $N_{STS}$ on each subcarrier to a complex vector whose length is $N_{TX}$, each element of the vector before mapping corresponds to space time stream data, and each element of the vector after mapping corresponds to a transmit link. Spatial mapping is performed on both an OFDM symbol (a preamble symbol for short below) used to place a preamble sequence and an OFDM symbol (a data symbol for short below) used to place to-be-transmitted data. That is, the spatial mapping matrix not only acts on the data symbol, but also acts on the preamble symbol. A receive end device estimates a channel state by using the preamble symbol. In this way, a channel estimation result obtained by the receive end device based on the preamble symbol is a comprehensive result of actual channel state information (CSI) and spatial mapping.

The actual channel state information is required for sensing, positioning, and the like on the ambient environment or the passive target. However, channel state information obtained by using the preamble symbol is not the actual channel state information. Consequently, sensing, positioning, and the like on the ambient environment or the passive target cannot be completed in the foregoing scenario.

SUMMARY

This application provides a method and an apparatus for sensing measurement, to eliminate impact of spatial mapping on a channel estimation result, thereby completing sensing, positioning, and like on an ambient environment or a passive target.

According to a first aspect, an embodiment of this application provides a method for sensing measurement. An execution body of the method may be a first device, or a module (for example, a chip) used in the first device. The following provides description by using an example in which the execution body is the first device. The method includes: The first device receives an indication frame, where the indication frame is used for indicating a spatial mapping matrix; and the first device determines channel state information based on the spatial mapping matrix and a channel estimation result.

Optionally, the first device may be an access point (AP) or a station (STA).

Optionally, the indication frame may indicate one or more spatial mapping matrices. For example, the one or more spatial mapping matrices may respectively correspond to spatial mapping matrices to be used by a transmit end device in different channel bandwidths and/or different numbers of space time streams. For another example, the one or more spatial mapping matrices are spatial mapping matrices from different transmit end devices.

Optionally, the spatial mapping matrix is used for mapping to-be-sent data onto a transmit link.

In the foregoing technical solution, the transmit end device may indicate, to the first device by using the indication frame, the spatial mapping matrix used by the transmit end device to send data to the first device. In this way, the first device eliminates impact of spatial mapping on the channel estimation result based on the spatial mapping matrix, to obtain actual channel state information, thereby completing sensing, positioning, and the like on an ambient environment or a passive target by using the obtained actual channel state information.

In addition, based on the foregoing technical solution, the first device does not need to pre-store or know manufacturer and spatial mapping information of the transmit end device, and devices of different manufacturers can perform sensing measurement together.

In a possible implementation, the indication frame includes a spatial mapping matrix field, and the spatial mapping matrix field is used for indicating the spatial mapping matrix.

In the foregoing technical solution, the transmit end device indicates the subsequently to-be-used spatial mapping matrix to the first device by adding the spatial mapping matrix field to the indication frame, so that the first device eliminates impact of spatial mapping on the channel estimation result based on the spatial mapping matrix, to obtain the actual channel state information, thereby completing sensing, positioning, and the like on the ambient environment or the passive target by using the obtained actual channel state information.

In a possible implementation, the spatial mapping matrix field includes at least one of a column number field, a row number field, a quantization bit number field, or a channel bandwidth field, where the column number field is used for indicating a number of columns of the spatial mapping matrix, the row number field is used for indicating a number of rows of the spatial mapping matrix, the quantization bit number field is used for indicating a number of quantization bits of the spatial mapping matrix, and the channel bandwidth field is used for indicating a channel bandwidth.

In the foregoing technical solution, the transmit end device indicates the spatial mapping matrix by indicating the number of rows, the number of columns, the number of quantization bits, and the like, and this solution is easier to implement.

In a possible implementation, the spatial mapping matrix field further includes a matrix field, and the matrix field is used for indicating bit sequences of the spatial mapping matrix after quantization.

When the spatial mapping matrix is not an identity matrix, a spatial mapping matrix cannot be accurately indicated only by using a number of rows, a number of columns, and a number of quantization bits. In the foregoing technical solution, the bit sequences obtained by quantizing the spatial mapping matrix may alternatively be added to the spatial mapping matrix field, to accurately indicate the spatial mapping matrix.

In a possible implementation, the spatial mapping matrix field includes an index of the spatial mapping matrix.

When types of the spatial mapping matrix are limited, each type of spatial mapping matrix may be numbered. In the foregoing technical solution, a number or an index of a corresponding spatial mapping matrix, rather than the complete bit sequences of the spatial mapping matrix after quantization, is stored in the spatial mapping matrix field, so that a length of information indicating the spatial mapping matrix can be reduced.

In a possible implementation, the indication frame includes a spatial mapping matrix element, and the spatial mapping matrix element includes the spatial mapping matrix field and at least one of an element ID field used for indicating an element identity (ID), an element length field used for indicating a length of the spatial mapping matrix field, or an element ID extension field used for indicating element ID extension.

In a possible implementation, before the indication frame is received, the method further includes: sending a request frame, where the request frame is used for requesting to feed back the spatial mapping matrix.

In the foregoing technical solution, only when the first device requests the transmit end device for the spatial mapping matrix, the transmit end device feeds back the spatial mapping matrix to the first device. In this way, an interaction process of the spatial mapping matrix can be performed only when the first device has a requirement of sensing measurement, and interaction of the spatial mapping matrix may not be performed when the first device has no requirement of sensing measurement. Therefore, signaling overheads can be reduced.

In a possible implementation, the request frame is a trigger frame, the trigger frame includes a first trigger type, and the first trigger type is used for triggering to feed back the spatial mapping matrix.

In a possible implementation, the indication frame includes at least one of a beacon frame, a null data packet announcement (NDPA) frame, a response frame for the trigger frame, or a dedicated illuminating frame, and the dedicated illuminating frame is further used for obtaining the channel estimation result.

According to a second aspect, an embodiment of this application provides a method for sensing measurement. An execution body of the method may be a second device, or a module (for example, a chip) used in the second device. The following provides description by using an example in which the execution body is the second device. The method includes: The second device generates an indication frame, where the indication frame is used for indicating a spatial mapping matrix; and the second device sends the indication frame.

Optionally, the second device may be an access point (AP) or a station (STA).

Optionally, the indication frame may indicate one or more spatial mapping matrices. For example, the one or more spatial mapping matrices may respectively correspond to spatial mapping matrices to be used by the second device in different channel bandwidths and/or different numbers of space time streams. For another example, the one or more spatial mapping matrices are spatial mapping matrices from different second devices.

Optionally, the spatial mapping matrix is used for mapping to-be-sent data onto a transmit link.

In the foregoing technical solution, the second device may indicate, to a receive end device by using the indication frame, the spatial mapping matrix used by the second device to send data to the receive end device. In this way, the receive end device eliminates impact of spatial mapping on a channel estimation result based on the spatial mapping matrix, to obtain actual channel state information, thereby completing sensing, positioning, and the like on an ambient environment or a passive target by using the obtained actual channel state information.

In addition, based on the foregoing technical solution, the receive end device does not need to pre-store or know manufacturer and spatial mapping information of the second device, and devices of different manufacturers can perform sensing measurement together.

In a possible implementation, the indication frame includes a spatial mapping matrix field, and the spatial mapping matrix field is used for indicating the spatial mapping matrix.

In the foregoing technical solution, the second device indicates the subsequently to-be-used spatial mapping matrix to the receive end device by adding the spatial mapping matrix field to the indication frame, so that the receive end device eliminates impact of spatial mapping on the channel estimation result based on the spatial mapping matrix, to obtain the actual channel state information, thereby completing sensing, positioning, and the like on the ambient environment or the passive target by using the obtained actual channel state information.

In a possible implementation, the spatial mapping matrix field includes at least one of a column number field, a row number field, a quantization bit number field, or a channel bandwidth field, where the column number field is used for indicating a number of columns of the spatial mapping matrix, the row number field is used for indicating a number of rows of the spatial mapping matrix, the quantization bit number field is used for indicating a number of quantization bits of the spatial mapping matrix, and the channel bandwidth field is used for indicating a channel bandwidth.

In the foregoing technical solution, the transmit end device indicates the spatial mapping matrix by indicating the number of rows, the number of columns, the number of quantization bits, and the like, and this solution is easier to implement.

In a possible implementation, the spatial mapping matrix field further includes a matrix field, and the matrix field is used for indicating bit sequences of the spatial mapping matrix after quantization.

When the spatial mapping matrix is not an identity matrix, a spatial mapping matrix cannot be accurately indicated only by using a number of rows, a number of columns, and a number of quantization bits. In the foregoing technical solution, the bit sequences obtained by quantizing the spatial mapping matrix may alternatively be added to the spatial mapping matrix field, to accurately indicate the spatial mapping matrix.

In a possible implementation, the spatial mapping matrix field includes an index of the spatial mapping matrix.

When types of the spatial mapping matrix are limited, each type of spatial mapping matrix may be numbered. In the foregoing technical solution, a number or an index of a corresponding spatial mapping matrix, rather than the complete bit sequences of the spatial mapping matrix after quantization, is stored in the spatial mapping matrix field, so that a length of information indicating the spatial mapping matrix can be reduced.

In a possible implementation, the indication frame includes a spatial mapping matrix element, and the spatial mapping matrix element includes the spatial mapping matrix field and at least one of an element ID field used for indicating an element identity (ID), an element length field used for indicating a length of the spatial mapping matrix field, and an element ID extension field used for indicating element ID extension.

In a possible implementation, before the indication frame is sent, the method further includes: receiving a request frame, where the request frame is used for requesting to feed back the spatial mapping matrix.

In the foregoing technical solution, only when the receive end device requests the second device for the spatial mapping matrix, the second device feeds back the spatial mapping matrix to the receive end device. In this way, an interaction process of the spatial mapping matrix can be performed only when the receive end device has a requirement of sensing measurement, and interaction of the spatial mapping matrix may not be performed when the receive end device has no requirement of sensing measurement. Therefore, signaling overheads can be reduced.

In a possible implementation, the request frame is a trigger frame, the trigger frame includes a first trigger type, and the first trigger type is used for triggering to feed back the spatial mapping matrix.

In a possible implementation, the indication frame includes at least one of a beacon frame, a null data packet announcement (NDPA) frame, a response frame for the trigger frame, or a dedicated illuminating frame, and the dedicated illuminating frame is further used for obtaining the channel estimation result.

According to a third aspect, this application provides an apparatus for sensing measurement, where the apparatus for sensing measurement includes modules configured to perform the method in the first aspect or any implementation of the first aspect.

In a possible implementation, the apparatus for sensing measurement includes a processor; and the processor is connected to a memory, and is configured to read and execute a software program stored in the memory, to implement the method in the first aspect or any implementation of the first aspect.

In a possible implementation, the apparatus for sensing measurement further includes a transceiver.

In a possible implementation, the apparatus for sensing measurement is a chip that may be used in a communication device.

In a possible implementation, the apparatus for sensing measurement is an AP or a STA.

According to a fourth aspect, this application provides an apparatus for sensing measurement, where the apparatus for sensing measurement includes modules configured to perform the method in the second aspect or any implementation of the second aspect.

In a possible implementation, the apparatus for sensing measurement includes a processor; and the processor is connected to a memory, and is configured to read and execute a software program stored in the memory, to implement the method in the second aspect or any implementation of the second aspect.

In a possible implementation, the apparatus for sensing measurement further includes a transceiver.

In a possible implementation, the apparatus for sensing measurement is a chip that may be used in a communication device.

In a possible implementation, the apparatus for sensing measurement is an AP or a STA.

According to a fifth aspect, this application provides a computer program product. The computer program product includes computer instructions. When executed, the computer instructions enable the method in the first aspect or any possible implementation of the first aspect to be performed, or enable the method in the second aspect or any possible implementation of the second aspect to be performed.

According to a sixth aspect, this application provides a computer-readable storage medium. The storage medium stores computer instructions. When executed, the computer instructions enable the method in the first aspect or any possible implementation of the first aspect to be performed, or enable the method in the second aspect or any possible implementation of the second aspect to be performed.

According to a seventh aspect, this application provides a communication system. The communication system includes the apparatus for sensing measurement in the third aspect and the apparatus for sensing measurement in the fourth aspect.

BRIEF DESCRIPTION OF DRAWINGS

FIG. 7 shows a format of a common information field according to an embodiment of this application;

FIG. 9 shows a frame structure of an NDPA frame according to an embodiment of this application;

DESCRIPTION OF EMBODIMENTS

The following describes technical solutions in this application with reference to accompanying drawings.

Embodiments of this application may be applied to a wireless local area network (WLAN). The WLAN may include a plurality of basic service sets (BSSs). Network nodes of the BSS include an access point (AP) and a station (STA). Each BSS may include one AP and a plurality of STAs associated with the AP.

The AP may also be referred to as a wireless access point, a hotspot, or the like. The AP is an access point for a user terminal to enter a wired network, and is mainly deployed in a home, a building, and a park. A typical coverage radius of the AP is tens of meters to a hundred meters. It should be understood that, the AP may alternatively be deployed outdoors. The AP is equivalent to a bridge that connects the wired network and a wireless network. A main function of the AP is to connect wireless network clients together, and then connect the wireless network to the Ethernet. Currently, standards mainly used by the AP are the Institute of Electrical and Electronics Engineers (IEEE) 802.11 family. Specifically, the AP may be a terminal device or a network device with a wireless fidelity (Wi-Fi) chip. Optionally, the AP may be a device supporting the WLAN standard.

The STA represents a user terminal in this application. The STA may be a wireless communication chip, a wireless sensor, or a wireless communication terminal. For example, a mobile phone supporting a Wi-Fi communication function, a tablet computer supporting the Wi-Fi communication function, a set-top box supporting the Wi-Fi communication function, a mart television supporting the Wi-Fi communication function, a smart wearable device supporting the Wi-Fi communication function, and a computer supporting the Wi-Fi communication function. Optionally, the STA may be a device supporting the WLAN standard.

Figure 1:
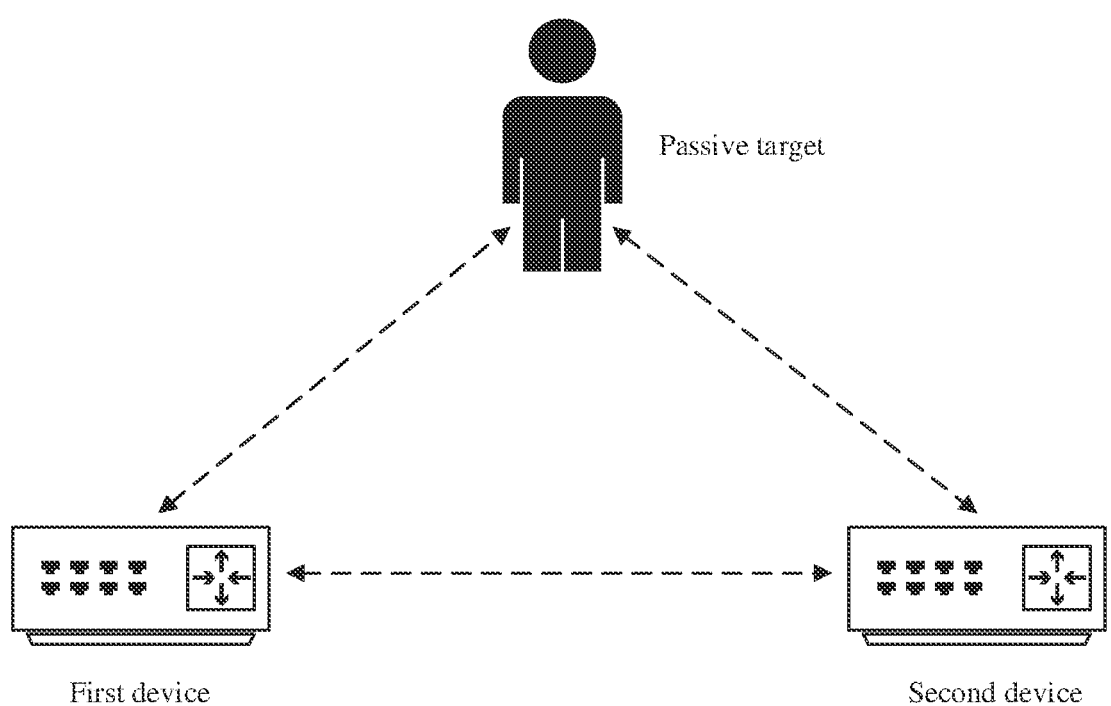
FIG. 1 is a schematic diagram of a scenario to which an embodiment of this application may be applied.

FIG. 1 is a schematic diagram of a scenario to which an embodiment of this application may be applied. A first device in FIG. 1 may be the foregoing AP or STA, and a second device may also be the foregoing AP or STA. In this scenario, the first device and the second device perform normal wireless communication with each other. When receiving a communication signal, the first device or the second device may implement sensing, positioning, and the like on a passive target by analyzing channel state information between the first device and the second device. Manners of signal transmission between the first device and the second device include but are not limited to an orthogonal frequency division multiple access (OFDMA) manner and a hybrid transmission manner of OFDMA and multi-station channel multiple-input multiple-output (MU-MIMO).

It should be noted that FIG. 1 is merely a schematic diagram. Numbers of APs and STAs included in this scenario are not limited in the embodiments of this application.

When the first device or the second device performs sensing measurement on an ambient environment or a passive target, actual channel state information (or in other words, real channel state information) is required because sensing measurement is to sense information such as a location and a speed of the target in the environment by using the real channel state information.

However, currently, a transmit end device usually performs spatial mapping on space time stream data by using a spatial mapping technology. To be specific, $N_{STS}$ pieces of space time stream data on each subcarrier in an orthogonal frequency division multiplexing (OFDM) symbol are mapped onto $N_{TX}$ transmit links. The spatial mapping may be implemented by using a spatial mapping matrix whose size is $N_{TX} \times N_{STS}$. The spatial mapping matrix maps a complex vector whose length is $N_{STS}$ on each subcarrier to a complex vector whose length is $N_{TX}$, each element of the vector before mapping corresponds to space time stream data, and each element of the vector after mapping corresponds to a transmit link.

Spatial mapping matrices in the embodiments of this application include but are not limited to the following types.

(1) Direct Mapping

The spatial mapping matrix $Q_k$ is a diagonal matrix. Values of diagonal elements may be in two forms. In a first form, the values of the diagonal elements are all 1. This is equivalent to a case in which there is no spatial mapping. In a second form, the diagonal elements indicate an effect of a cyclic shift, for example, $\exp(-j2\pi k\Delta_F \tau_{CS}^i)$, where $\tau_{CS}^i$ represents CSD, and i=1, . . . , $N_{TX}$.

(2) Indirect Mapping

The spatial mapping matrix $Q_k$ is a product of a cyclic shift diversity (CSD) matrix and a unitary matrix, where the unitary matrix may be a Hadamard matrix or a Fourier matrix.

(3) Spatial Expansion

In this case, a number of space time streams is usually less than a number of transmit links. The spatial mapping matrix $Q_k$ may be a product of a CSD matrix and a matrix with orthogonal columns. For example, some space time streams are repeated first, so that the number of space time streams is equal to the number of transmit links, and then each stream is multiplied by a normalization coefficient $\sqrt{N_{STS}/N_{TX}}$. In other words, the spatial mapping matrix $Q_k$ is a product of the CSD matrix $M_{CSD}(k)$ and a matrix D. The matrix D may include the types shown in the following:

$$N_{TX} = 2, N_{STS} = 1, D = \frac{1}{\sqrt{2}}[1 \quad 1]^T; \quad \text{(i)}$$

$$N_{TX} = 3, N_{STS} = 1, D = \frac{1}{\sqrt{3}}[1 \quad 1 \quad 1]^T; \quad \text{(ii)}$$

$$N_{TX} = 4, N_{STS} = 1, D = \frac{1}{2}[1 \quad 1 \quad 1 \quad 1]^T; \quad \text{(iii)}$$

$$N_{TX} = 3, N_{STS} = 2, D = \sqrt{\frac{2}{3}}\begin{bmatrix} 1 & 0 \\ 0 & 1 \\ 1 & 0 \end{bmatrix}^T; \quad \text{(iv)}$$

$$N_{TX} = 4, N_{STS} = 2, D = \frac{1}{\sqrt{2}}\begin{bmatrix} 1 & 0 \\ 0 & 1 \\ 1 & 0 \\ 0 & 1 \end{bmatrix}^T; \text{ and} \quad \text{(v)}$$

-continued $$N_{TX} = 4, N_{STS} = 3, D = \frac{\sqrt{3}}{2}\begin{bmatrix} 1 & 0 & 0 \\ 0 & 1 & 0 \\ 0 & 0 & 1 \\ 1 & 0 & 0 \end{bmatrix}^T. \quad \text{(vi)}$$

In addition, some transmit links may alternatively not be used. For example, the spatial mapping matrix is shown as follows:

$$N_{TX} = 2, N_{STS} = 1, [Q_k]_{N_{STS}} = [1\ 0]^T \text{ or } [0\ 1]^T; \quad \text{(i)}$$

$$N_{TX} = 3, N_{STS} = 2, [Q_k]_{N_{STS}} = \begin{bmatrix} 1 & 0 \\ 0 & 0 \\ 0 & 1 \end{bmatrix}, \begin{bmatrix} 1 & 0 \\ 0 & 0 \\ 0 & 1 \end{bmatrix}, \begin{bmatrix} 1 & 0 \\ 0 & 0 \\ 0 & 1 \end{bmatrix}; \quad \text{(ii)}$$

$$N_{TX} = 4, N_{STS} = 2, [Q_k]_{N_{STS}} = \begin{bmatrix} 1 & 0 \\ 0 & 0 \\ 0 & 0 \\ 0 & 1 \end{bmatrix}, \quad \text{(iii)}$$

$$\begin{bmatrix} 1 & 0 \\ 0 & 0 \\ 0 & 1 \\ 0 & 0 \end{bmatrix}, \begin{bmatrix} 0 & 0 \\ 1 & 0 \\ 0 & 0 \\ 0 & 1 \end{bmatrix}, \text{ or } \begin{bmatrix} 0 & 0 \\ 1 & 0 \\ 0 & 1 \\ 0 & 0 \end{bmatrix}; \text{ and}$$

$$N_{TX} = 4, N_{STS} = 3, [Q_k]_{N_{STS}} = \begin{bmatrix} 1 & 0 & 0 \\ 0 & 1 & 0 \\ 0 & 0 & 0 \\ 0 & 0 & 1 \end{bmatrix} \text{ or } \begin{bmatrix} 1 & 0 & 0 \\ 0 & 0 & 0 \\ 0 & 1 & 0 \\ 0 & 0 & 1 \end{bmatrix}. \quad \text{(iv)}$$

(4) Beamforming Steering Matrix

The spatial mapping matrix $Q_k$ may be any matrix that is obtained based on information about a channel between a receive end device and a transmit end device and that can improve performance of the receive end device. For example, under explicit feedback of transmit end beamforming, the spatial mapping matrix $Q_k$ may be obtained by using a compressed or non-compressed matrix $V_k$ fed back by the transmit end device.

Because the spatial mapping matrix simultaneously acts on a preamble symbol and a data symbol, spatial mapping is transparent for the receive end device. The receive end device estimates a channel state by using the preamble symbol. In this way, a channel estimation result obtained by the receive end device based on the preamble symbol is a comprehensive result of actual channel state information and spatial mapping, rather than the actual channel state information.

In addition, for the receive end device, spatial mapping is transparent. Therefore, no specific spatial mapping method, or in other words, no specific spatial mapping matrix is specified in a Wi-Fi standard. Different devices may use different spatial mapping matrices to complete spatial mapping. In this way, the receive end device and the transmit end device may use different spatial mapping matrices. As a result, the receive end device cannot eliminate impact of spatial mapping on the channel estimation result, and cannot complete sensing, positioning, and the like on an ambient environment or a passive target.

For example, a manufacturer designs a unique spatial mapping matrix, and applies the spatial mapping matrix to the first device. After a second device of another manufacturer obtains channel state information by estimating a channel state based on a signal sent by the first device, because the second device does not know the unique spatial mapping matrix used by the first device, the second device cannot eliminate impact of spatial mapping on the channel estimation result. Consequently, the second device cannot complete sensing, positioning, and the like on an ambient environment or a passive target.

For the foregoing problem, this application provides a method and an apparatus for sensing measurement, to eliminate impact of spatial mapping on a channel estimation result, thereby completing sensing, positioning, and like on an ambient environment or a passive target.

Figure 2:
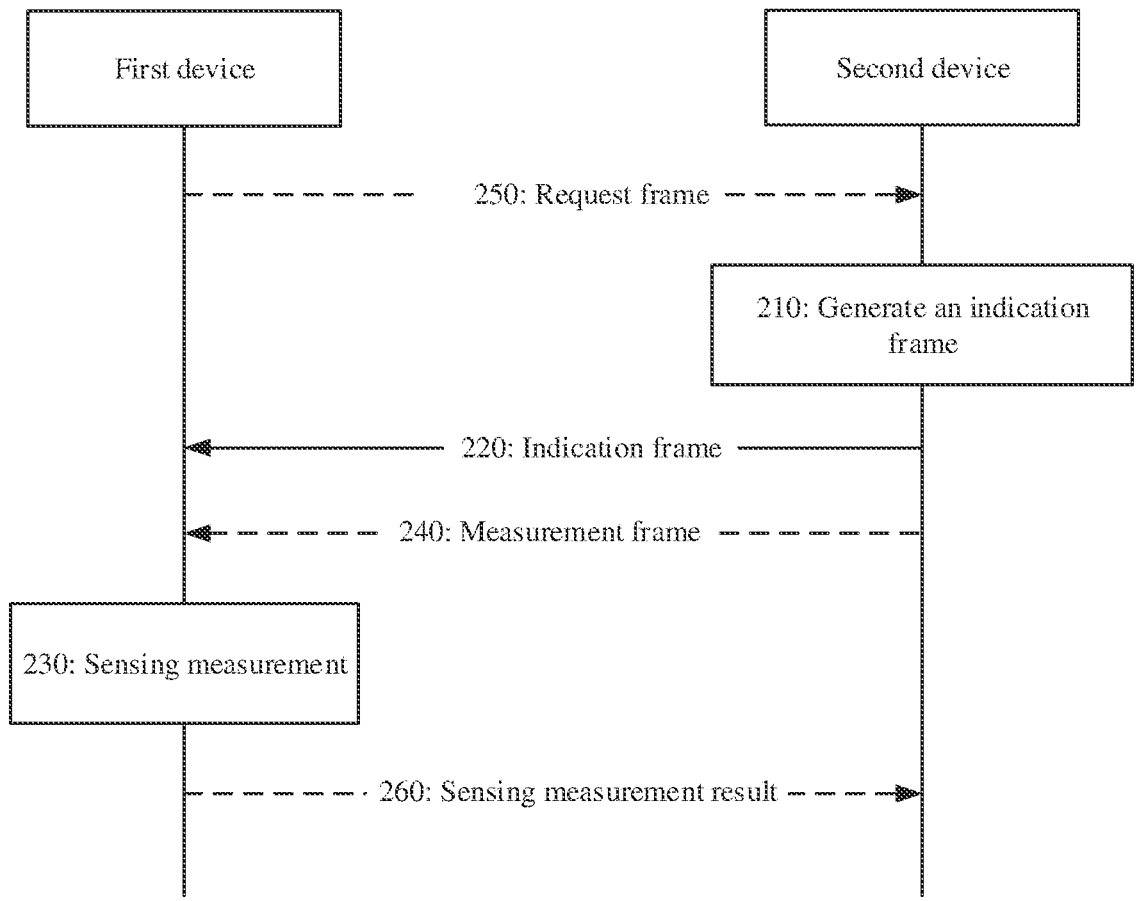
FIG. 2 is a schematic flowchart of a method for sensing measurement according to an embodiment of this application.

FIG. 2 is a schematic flowchart of a method for sensing measurement according to an embodiment of this application. The method in FIG. 2 may be applied to the first device and the second device shown in FIG. 1. In this embodiment of this application, an example in which the first device and the second device are used as execution bodies is used for description. It should be understood that the execution bodies may alternatively be a chip used in the first device and a chip used in the second device. This is not specifically limited in this embodiment of this application.

In 210, the second device generates an indication frame, where the indication frame is used for indicating a spatial mapping matrix.

Optionally, the indication frame may indicate one or more spatial mapping matrices, where the one or more spatial mapping matrices may respectively correspond to different channel bandwidths and/or different numbers of space time streams. Optionally, when the indication frame indicates one spatial mapping matrix, the spatial mapping matrix may be a spatial mapping matrix corresponding to a current channel bandwidth and a current number of space time streams of the second device, or a spatial mapping matrix to be subsequently used by the second device. Optionally, when the indication frame indicates a plurality of spatial mapping matrices, the plurality of spatial mapping matrices may be spatial mapping matrices that may be used by the second device.

It may be understood that the spatial mapping matrix is the spatial mapping matrix described above, and is used to map to-be-sent data onto a transmit link. For detailed description, refer to the foregoing related description.

In 220, the second device sends the indication frame to the first device, and correspondingly, the first device receives the indication frame from the second device.

There are many manners of indicating the foregoing spatial mapping matrix to the first device by the second device by using the indication frame. This is not specifically limited in this application.

In a first example, the second device sends a beacon frame to the first device, in other words, the indication frame is the beacon frame.

When the first device is a STA, and the second device is an AP, the second device may indicate, in the beacon frame sent to the first device, spatial mapping matrices to be used by the second device in different channel bandwidths and/or different numbers of space time streams.

Table 1 lists some elements that may be carried in the beacon frame. In this embodiment, a new element, namely, a spatial mapping matrix element, is added to the beacon frame for indicating the foregoing spatial mapping matrix.

TABLE 1

| Sorting | Information | Description |
|---|---|---|
| 1 | Timestamp | ... |
| ... | ... | ... |
| 86 | HE extension function | ... |
| Available sequence number | Spatial mapping matrix element | If CSI-based sensing is supported, the spatial mapping matrix element may be carried |
| Last one | Manufacturer characteristics | |

Optionally, the spatial mapping matrix element includes a spatial mapping matrix field and at least one of an element ID field used for indicating an element identity (ID), an element length field used for indicating a length of the spatial mapping matrix field, or an element ID extension field used for indicating element ID extension.

Figure 3:
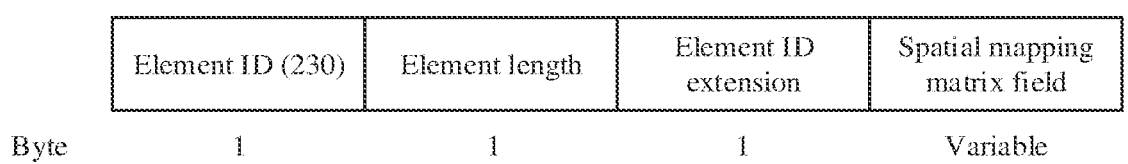
FIG. 3 is a schematic diagram of a structure of a spatial mapping matrix element according to an embodiment of this application.

For example, FIG. 3 specifically shows a schematic structure of a spatial mapping matrix element according to an embodiment of this application. As shown in FIG. 3, the spatial mapping matrix element includes a spatial mapping matrix field, an element ID field used for indicating an element identity (ID), an element length field used for indicating a length of the spatial mapping matrix field, and an element ID extension field used for indicating element ID extension. The spatial mapping matrix field is used for indicating the foregoing spatial mapping matrix, and a length of the field is variable.

Optionally, the spatial mapping matrix field includes at least one of a column number field, a row number field, a quantization bit number field, or a channel bandwidth field, where the column number field is used for indicating a number of columns of the spatial mapping matrix, the row number field is used for indicating a number of rows of the spatial mapping matrix, the quantization bit number field is used for indicating a number of quantization bits of the spatial mapping matrix, and the channel bandwidth field is used for indicating a channel bandwidth.

Figure 4:
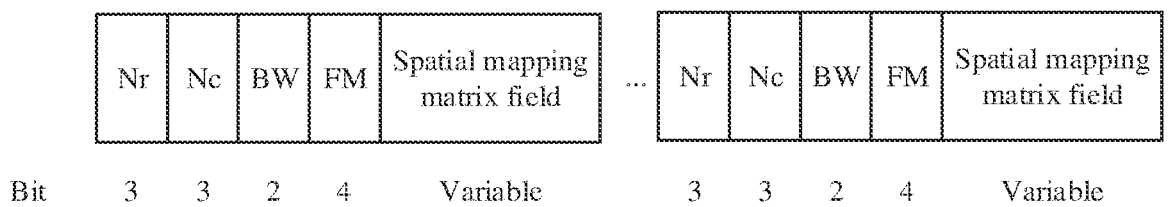
FIG. 4 is a schematic diagram of a structure of a spatial mapping matrix field according to an embodiment of this application.

For example, FIG. 4 specifically shows a schematic structure of a spatial mapping matrix field according to an embodiment of this application. As shown in FIG. 4, each spatial mapping matrix in the spatial mapping matrix field is separately indicated by using a column number field (namely, an Nc field), a row number field (namely, an Nr field), a quantization bit number field (namely, an FM field), a channel bandwidth field (namely, a bandwidth (BW) field), and a matrix field. Content specifically indicated in each field is shown in Table 2. It may be understood that, when the indication frame indicates a plurality of spatial mapping matrices, the spatial mapping matrix field includes a plurality of groups of Nc fields, Nr fields, BW fields, FM fields, and matrix fields.

TABLE 2

| Field | Description |
|---|---|
| Nc field | Indicating a number of columns of the spatial mapping matrix minus 1, also equal to a number of space time streams |
| Nr field | Indicating a number of rows of the spatial mapping matrix minus 1, also equal to a number of transmit links |
| BW field | Indicating a channel bandwidth corresponding to the spatial mapping matrix |
| FM field | Indicating a number of quantization bits of the spatial mapping matrix; and when the FM field is 0, indicating that the spatial mapping matrix used is an identity matrix, and in this case, there may be no spatial mapping matrix field |
| Spatial mapping matrix field | Indicating bit sequences of a spatial mapping matrix after quantization or compression |

Quantization of the spatial mapping matrix means that the spatial mapping matrix finally needs to be converted into a bit stream of 0 and 1. Each element in the spatial mapping matrix needs to be indicated by using a binary number with a specific length, a process of converting the element into the binary number is quantization, and a length of the binary number obtained through conversion is the number of quantization bits in Table 2. Specifically, because the spatial mapping matrix is usually a unitary matrix, the unitary matrix may be converted into a plurality of angle parameters with reference to a Given Rotation method in compressed beamforming feedback in the 802.11 standard, and then the angle parameters are quantized, so that a length of information used for indicating the spatial mapping matrix can be compressed.

In addition, because types of the spatial mapping matrix are limited, each type of spatial mapping matrix may alternatively be numbered, so that only a number or an index of a corresponding spatial mapping matrix needs to be stored in the spatial mapping matrix field. In this way, the length of the information used for indicating the spatial mapping matrix can be further reduced.

After receiving the beacon frame sent by the second device, the first device may learn of spatial mapping matrices to be used by the second device in different channel bandwidths and/or different numbers of space time streams.

In a second example, the second device sends a response frame for a trigger frame to the first device, in other words, the indication frame is the response frame.

When the first device is an AP, and the second device is a STA, before 220, step 250 may be further performed. To be specific, the first device sends the trigger frame to the second device, where the trigger frame is used for requesting the second device to feed back spatial mapping matrices to be used by the second device in different channel bandwidths and/or different numbers of space time streams. It may be understood that, in this example, the trigger frame corresponds to the request frame in FIG. 2.

Figure 5:
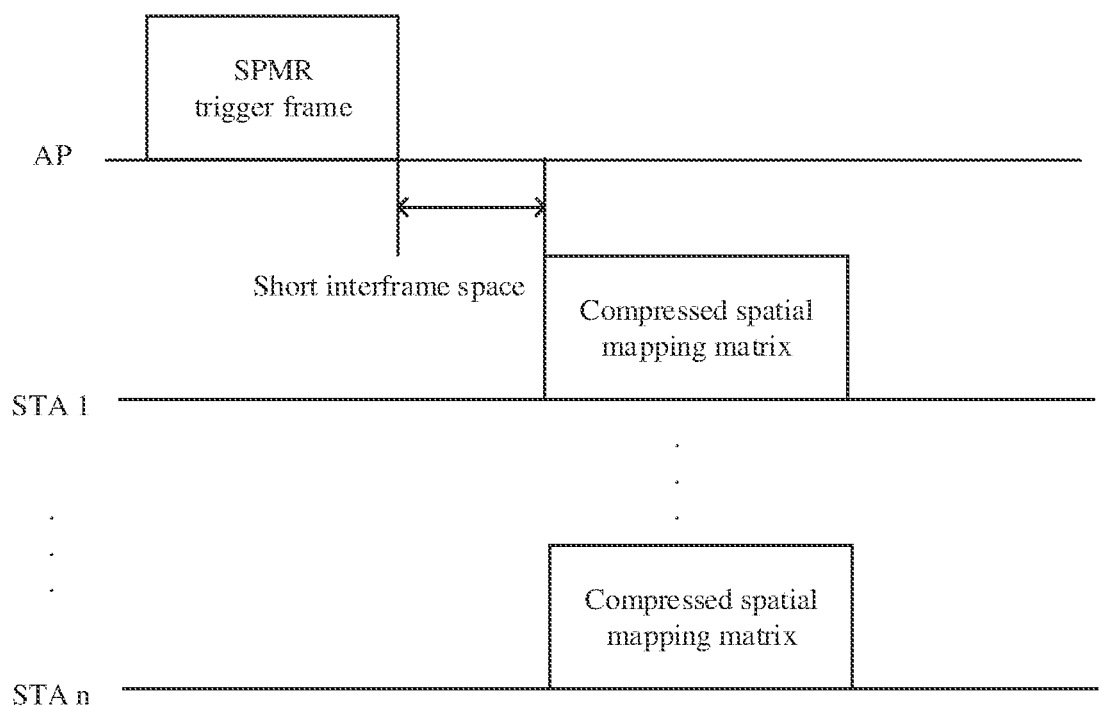
FIG. 5 shows an indication manner of a spatial mapping matrix according to an embodiment of this application.

Specifically, as shown in FIG. 5, the first device sends a spatial mapping matrix request (SPMR) trigger frame to the second device, to trigger the second device to feed back spatial mapping matrices to be used by the second device in different channel bandwidths and/or different numbers of space time streams. After receiving the SPMR trigger frame, the second device sends the indication frame to the first device in response to the SPMR trigger frame, where the indication frame is used for indicating the spatial mapping matrices to be used by the second device in different channel bandwidths and/or different numbers of space time streams.

For specific description of the indication frame, refer to related descriptions of FIG. 3 and FIG. 4.

In addition, the second device may alternatively add only the spatial mapping matrix field to the indication frame and does not need to add a new element.

Figure 6:
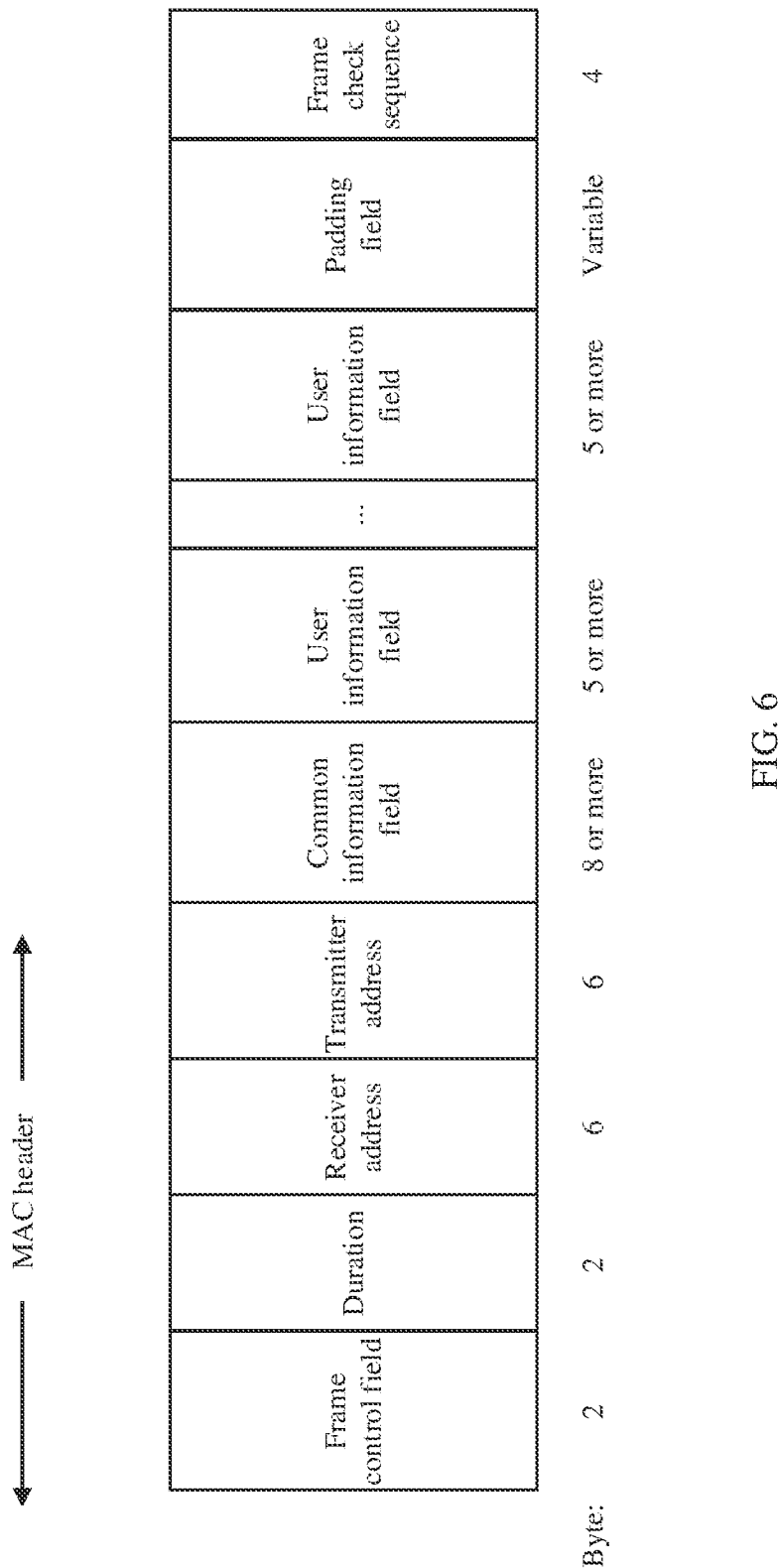
FIG. 6 shows a format of an SPMR trigger frame according to an embodiment of this application.

FIG. 6 shows a format of an SPMR trigger frame according to an embodiment of this application. FIG. 7 shows a format of a common information field according to an embodiment of this application. In this embodiment, a new trigger type is added to trigger types of the common information field of the SPMR trigger frame, to indicate the second device receiving the SPMR trigger frame to feed back the spatial mapping matrices to be used by the second device.

Table 3 lists some trigger types that may be carried in the common information field. When a value of a trigger type field is 9, a corresponding spatial mapping matrix report is a newly added trigger type.

TABLE 3

| Value of a trigger type field | Trigger frame type |
| --- | --- |
| 0 | Basic trigger frame |
| 1 | Beamforming report poll trigger frame |
| 2 | Multi-user block acknowledgement request trigger frame |
| 3 | Multi-user request to send trigger frame |
| 4 | Buffer status report poll trigger frame |
| 5 | Groupcast with retries multi-user block acknowledgement request trigger frame |
| 6 | Bandwidth query report poll trigger frame |
| 7 | Null data packet feedback report poll trigger frame |
| 8 | Ranging trigger frame |
| 9 | Spatial mapping matrix report trigger frame |
| 10 to 15 | Reserved |

It may be understood that, as shown in FIG. 5, the first device may send the SPMR trigger frame to a plurality of second devices. For example, the first device broadcasts the SPMR trigger frame. The plurality of second devices receiving the SPMR trigger frame each feeds back an indication frame to the first device. The first device determines, based on the received indication frame, real channel state information between the first device and the second device sending the indication frame. The first device performs sensing, positioning, and the like on an ambient environment or a passive target by integrating a plurality of pieces of actual channel state information.

In a third example, the second device sends a null data packet announcement (NDPA) frame to the first device, in other words, the indication frame is the NDPA frame.

Figure 8:
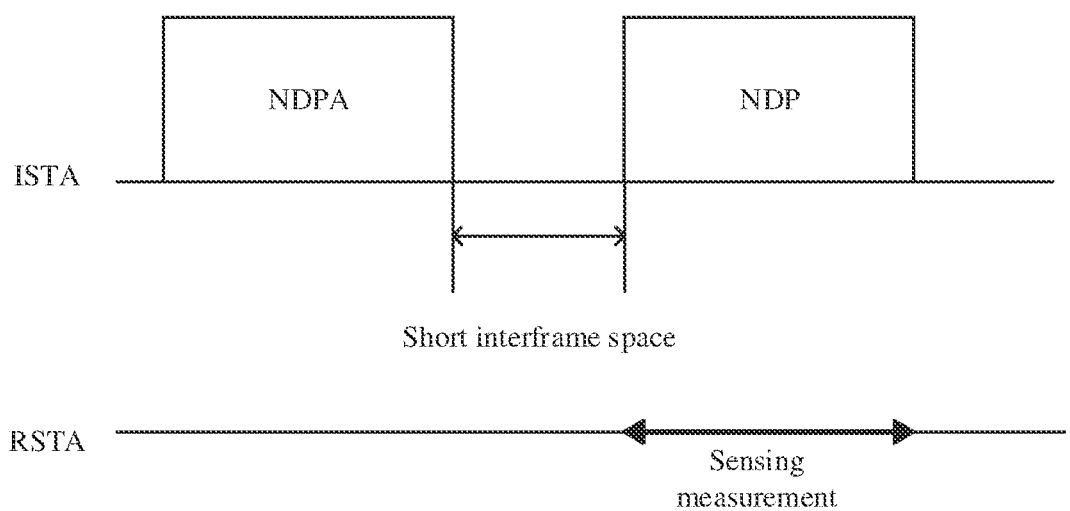
FIG. 8 shows another indication manner of a spatial mapping matrix according to an embodiment of this application.

As shown in FIG. 8, when the first device is a responder station (RSTA), and the second device is an initiator station (ISTA), the second device may send the NDPA frame to the first station, to indicate the spatial mapping matrix to be subsequently used by the second device to send an NDP frame. FIG. 9 shows a frame structure of an NDPA frame according to an embodiment of this application. The spatial mapping matrix field is a newly added field. For a specific format of the spatial mapping matrix field, refer to the related description of FIG. 4.

Figures 10, 11:
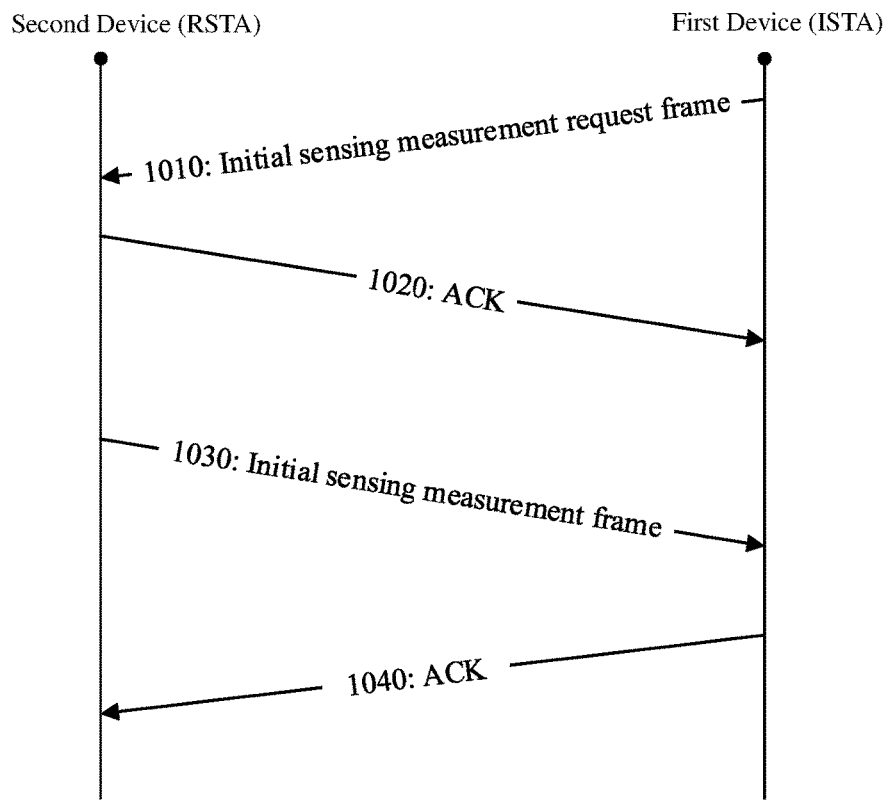
FIG. 10 is a schematic diagram of a negotiation process before sensing measurement according to an embodiment of this application.
FIG. 11 is a schematic diagram of a structure of a sensing parameter element according to an embodiment of this application.

In a fourth example, as shown in FIG. 10, when the first device is an ISTA, and the second device is an RSTA, before the first device and the second device perform sensing measurement, a negotiation phase may exist. In the negotiation phase, the first device and the second device exchange parameters and capabilities of sensing measurement.

Specifically, in 1010, the first device sends an initial sensing measurement request frame to the second device, and correspondingly, the second device receives the initial sensing measurement request frame sent by the first device, where the initial sensing measurement request frame is used for requesting the second device to assist in sensing measurement.

In 1020, after receiving the initial sensing measurement request frame, the second device first replies with an acknowledgement (ACK) frame, to feed back to the first device that the initial sensing measurement request frame is already correctly received.

In 1030, the second device then determines, based on a condition of the second device, whether to respond to the request of the first device. If the second device agrees to the request for performing sensing measurement, the second device sends an initial sensing measurement frame to the first device, or the second device sends the initial sensing measurement frame to the first device after a period of time, where the period of time cannot be greater than a preset threshold. If the second device does not agree to perform sensing measurement, the second device does not send the initial sensing measurement frame to the first device, and the first device considers that the second device does not agree to perform sensing measurement when the period of time exceeds the preset threshold.

In 1040, when the second device agrees to perform sensing measurement, after receiving the initial sensing measurement request, the first device replies to the second device with an ACK frame, and the negotiation process ends at this time.

Therefore, the second device may indicate, in the initial sensing measurement frame, the spatial mapping matrix used by the second device, in other words, the indication frame is the initial sensing measurement frame.

It may be understood that the foregoing initial sensing measurement request frame may correspond to the request frame in FIG. 2.

Optionally, the first device may also indicate, in the initial sensing measurement request frame, the spatial mapping matrix used by the first device. In this way, the initial sensing measurement request frame and the initial sensing measurement frame may use a same frame structure to simplify a design process.

In the foregoing negotiation process, the initial sensing measurement request frame and the initial sensing measurement frame each may carry a sensing parameter element, and the spatial mapping matrix element shown in FIG. 3 and FIG. 4 may be further added to a sub-element of the sensing parameter element, or the spatial mapping matrix field shown in FIG. 4 may be added to the sensing parameter element. For example, the spatial mapping matrix element shown in FIG. 3 and FIG. 4 is added to the sub-element of the sensing parameter element. A structure of the sensing parameter element may be shown in FIG. 11.

In a fifth example, to better perform sensing measurement, the indication frame in this embodiment may alternatively be a dedicated illuminating frame for sensing measurement, and the illuminating frame may include a segment of radar signals such as FMCE. The second device may indicate the foregoing one or more spatial mapping matrices to the first device by using the illuminating frame. The illuminating frame may carry the spatial mapping matrix element shown in FIG. 3 and FIG. 4, or carry the spatial mapping matrix field shown in FIG. 4. This is not specifically limited in this embodiment of this application.

It may be understood that the indication frame in this embodiment may be in any form, provided that the second device can indicate, to the first device, the one or more spatial mapping matrices that may be used by the second device.

In 230, the first device determines channel state information based on the spatial mapping matrix and a channel estimation result, and performs sensing measurement based on the actual channel state information.

Optionally, before 230, the first device needs to obtain the channel estimation result.

Specifically, 240 may be performed. The second device sends a measurement frame to the first device, and the first device obtains, based on a preamble symbol of the measurement frame, the channel estimation result C obtained after spatial mapping, namely, C=HQ, where H is the actual channel state information, and Q is the spatial mapping matrix used by the second device to send the measurement frame.

Further, when the indication frame indicates a plurality of spatial mapping matrices, the first device determines, based on information about a channel bandwidth and/or a number of space time streams carried in the measurement frame, Q in the plurality of spatial mapping matrices obtained by using the indication frame, and further, the first device obtains, based on the channel estimation result C and the spatial mapping matrix Q, the channel state information H from which impact of spatial mapping is eliminated. Optionally, $H=C \times Q^H$, where $Q^H$ is a conjugate transpose of Q. In this way, the first device can obtain the actual channel state information, or in other words, the channel state information from which the impact of spatial mapping is eliminated, to complete sensing, positioning, and the like on the ambient environment or the passive target by using the obtained actual channel state information.

Figure 12:
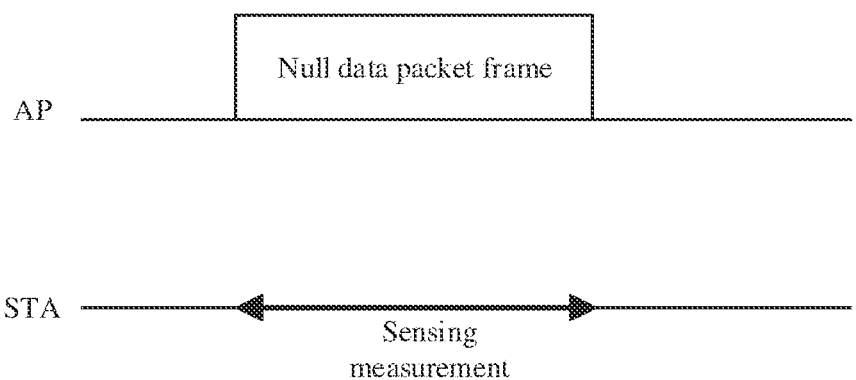
FIG. 12 is a schematic flowchart of sensing measurement according to an embodiment of this application.

In a possible implementation, as shown in FIG. 12, the measurement frame may be a null data packet (NDP) frame.

Figure 13:
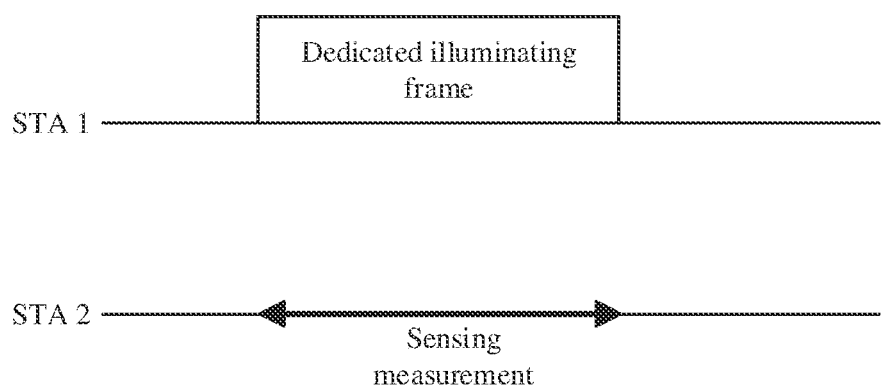
FIG. 13 is a schematic flowchart of sensing measurement according to another embodiment of this application.

In another possible implementation, as shown in FIG. 13, when the indication frame is a dedicated illuminating frame, the dedicated illuminating frame may alternatively be used as a measurement frame. In other words, when indicating the spatial mapping matrix used by the second device, the dedicated illuminating frame may also be used as a measurement signal.

In some embodiments, after 230, the first device may further feed back a sensing measurement result to the second device, in other words, perform 260. In this way, each device in a communication network not only can perform sensing measurement by itself, but also can obtain a sensing measurement result of another device, and can obtain a more accurate measurement result by analyzing more information.

It may be understood that, to implement functions in the foregoing embodiments, the apparatus for sensing measurement includes corresponding hardware structures and/or software modules for performing the functions. A person skilled in the art should easily be aware that, in combination with the units and the method steps in the examples described in the embodiments disclosed in this application, this application can be implemented by hardware or a combination of hardware and computer software. Whether a function is performed by hardware or hardware driven by computer software depends on particular application scenarios and design constraints of the technical solutions. The following describes apparatus embodiments of this application with reference to FIG. 14 to FIG. 17. These apparatuses may be configured to implement the functions of the first device or the second device in the foregoing method embodiment, and therefore can also achieve the beneficial effects of the foregoing method embodiment.

Figure 14:
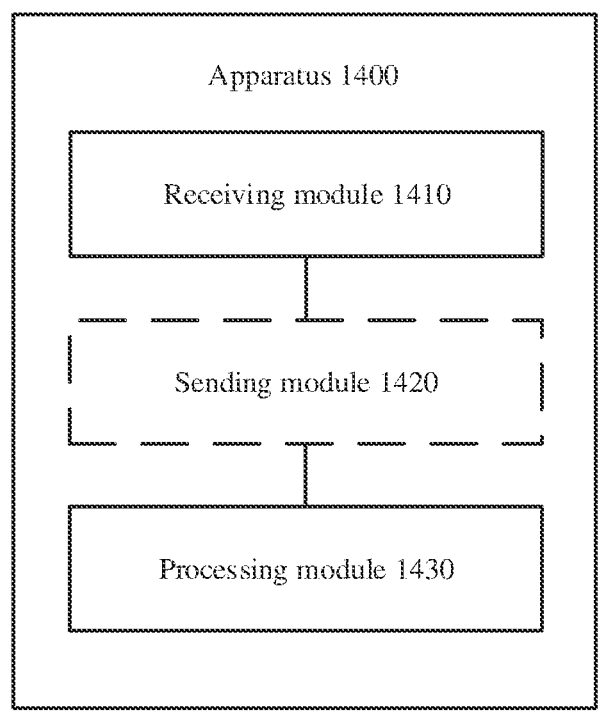
FIG. 14 is a schematic diagram of a structure of an apparatus for sensing measurement according to an embodiment of this application.

FIG. 14 is a schematic diagram of a structure of an apparatus for sensing measurement according to an embodiment of this application. An apparatus 1400 shown in FIG. 14 may be the first device shown in FIG. 1, or a module (for example, a chip) used in the first device. As shown in FIG. 14, the apparatus 1400 includes a receiving module 1410 and a processing module 1430.

The receiving module 1410 is configured to receive an indication frame, where the indication frame is used for indicating a spatial mapping matrix.

The processing module 1430 is configured to determine channel state information based on the spatial mapping matrix and a channel estimation result.

Optionally, the indication frame includes a spatial mapping matrix field, and the spatial mapping matrix field is used for indicating the spatial mapping matrix.

Optionally, the spatial mapping matrix field includes at least one of a column number field, a row number field, a quantization bit number field, or a channel bandwidth field, where the column number field is used for indicating a number of columns of the spatial mapping matrix, the row number field is used for indicating a number of rows of the spatial mapping matrix, the quantization bit number field is used for indicating a number of quantization bits of the spatial mapping matrix, and the channel bandwidth field is used for indicating a channel bandwidth.

Optionally, the spatial mapping matrix field further includes a matrix field, and the matrix field is used for indicating bit sequences of the spatial mapping matrix after quantization.

Optionally, the spatial mapping matrix field includes an index of the spatial mapping matrix.

Optionally, the indication frame includes a spatial mapping matrix element, and the spatial mapping matrix element includes the spatial mapping matrix field and at least one of an element ID field used for indicating an element identity (ID), an element length field used for indicating a length of the spatial mapping matrix field, or an element ID extension field used for indicating element ID extension.

Optionally, the apparatus 1400 further includes a sending module 1420, configured to send a request frame before the indication frame is received, where the request frame is used for requesting to feed back the spatial mapping matrix.

Optionally, the request frame is a trigger frame, the trigger frame includes a first trigger type, and the first trigger type is used for triggering to feed back the spatial mapping matrix.

Optionally, the indication frame includes at least one of a beacon frame, a null data packet announcement (NDPA) frame, a response frame for the trigger frame, or a dedicated illuminating frame, and the dedicated illuminating frame is further used for obtaining the channel estimation result.

The receiving module 1410 and the sending module 1420 may be implemented by a transceiver. The processing module 1430 may be implemented by a processor. For specific functions and beneficial effects of the receiving module 1410, the sending module 1420, and the processing module 1430, refer to the foregoing method embodiment.

Figure 15:
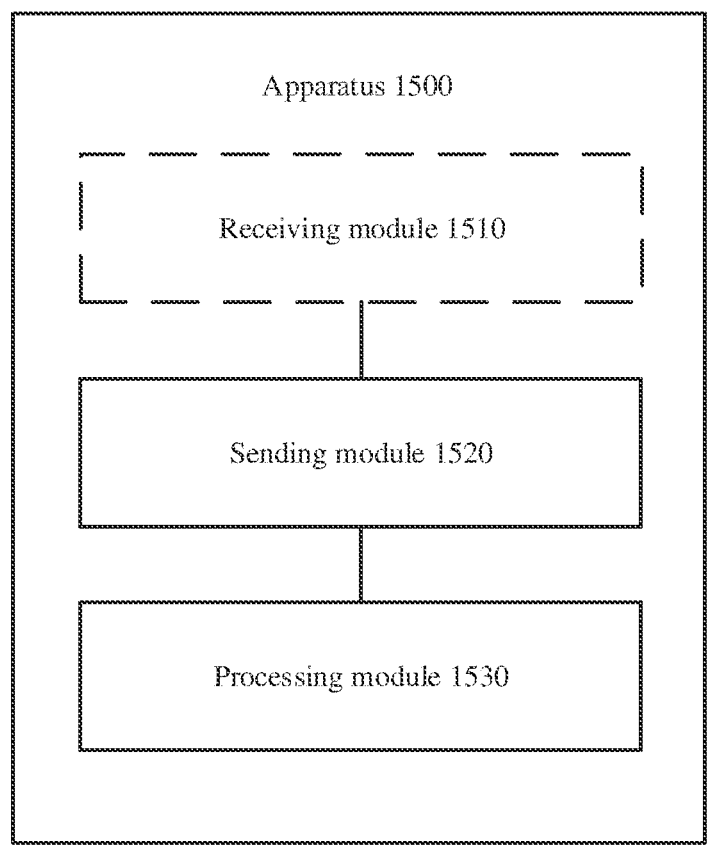
FIG. 15 is a schematic diagram of a structure of an apparatus for sensing measurement according to another embodiment of this application.

FIG. 15 is a schematic diagram of a structure of an apparatus for sensing measurement according to another embodiment of this application. An apparatus 1500 shown in FIG. 15 may be the second device shown in FIG. 1, or a module (for example, a chip) used in the second device. As shown in FIG. 15, the apparatus 1500 includes a sending module 1520 and a processing module 1530.

The processing module 1530 is configured to generate an indication frame, where the indication frame is used for indicating a spatial mapping matrix.

The sending module 1520 is configured to send the indication frame.

Optionally, the indication frame includes a spatial mapping matrix field, and the spatial mapping matrix field is used for indicating the spatial mapping matrix.

Optionally, the spatial mapping matrix field includes at least one of a column number field, a row number field, a quantization bit number field, and a channel bandwidth field, where the column number field is used for indicating a number of columns of the spatial mapping matrix, the row number field is used for indicating a number of rows of the spatial mapping matrix, the quantization bit number field is used for indicating a number of quantization bits of the spatial mapping matrix, and the channel bandwidth field is used for indicating a channel bandwidth.

Optionally, the spatial mapping matrix field further includes a matrix field, and the matrix field is used for indicating bit sequences of the spatial mapping matrix after quantization.

Optionally, the spatial mapping matrix field includes an index of the spatial mapping matrix.

Optionally, the indication frame includes a spatial mapping matrix element, and the spatial mapping matrix element includes the spatial mapping matrix field and at least one of an element ID field used for indicating an element identity (ID), an element length field used for indicating a length of the spatial mapping matrix field, and an element ID extension field used for indicating element ID extension.

Optionally, the apparatus 1500 further includes a receiving module 1510, configured to receive a request frame before the indication frame is sent, where the request frame is used for requesting to feed back the spatial mapping matrix.

Optionally, the request frame is a trigger frame, the trigger frame includes a first trigger type, and the first trigger type is used for triggering to feed back the spatial mapping matrix.

Optionally, the indication frame includes at least one of a beacon frame, a null data packet announcement (NDPA) frame, a response frame for the trigger frame, or a dedicated illuminating frame, and the dedicated illuminating frame is further used for obtaining a channel estimation result.

The receiving module 1510 and the sending module 1520 may be implemented by a transceiver. The processing module 1530 may be implemented by a processor. For specific functions and beneficial effects of the receiving module 1510, the sending module 1520, and the processing module 1530, refer to the foregoing method embodiment.

Figure 16:
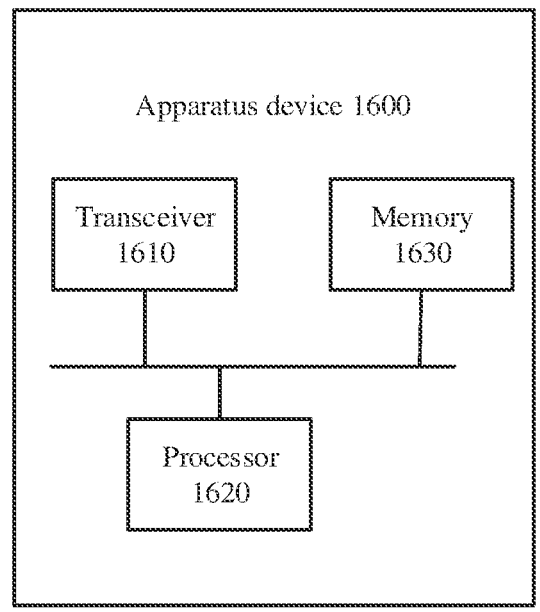
FIG. 16 is a schematic diagram of a structure of an apparatus for sensing measurement according to another embodiment of this application.

FIG. 16 is a schematic diagram of a structure of an apparatus for sensing measurement according to another embodiment of this application. An apparatus 1600 shown in FIG. 16 may be the first device shown in FIG. 1, or a module (for example, a chip) used in the first device. As shown in FIG. 16, the apparatus 1600 may include a transceiver 1610, a processor 1620, and a memory 1630.

FIG. 16 shows only one memory and one processor. In an actual product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 1610, the processor 1620, and the memory 1630 communicate with each other through an internal connection path and transfer a control signal and/or a data signal.

Specifically, the transceiver 1610 is configured to receive an indication frame, where the indication frame is used for indicating a spatial mapping matrix.

The processor 1620 is configured to determine channel state information based on the spatial mapping matrix and a channel estimation result.

For a specific working process and beneficial effects of the apparatus 1600, refer to related descriptions in the foregoing method embodiment.

Figure 17:
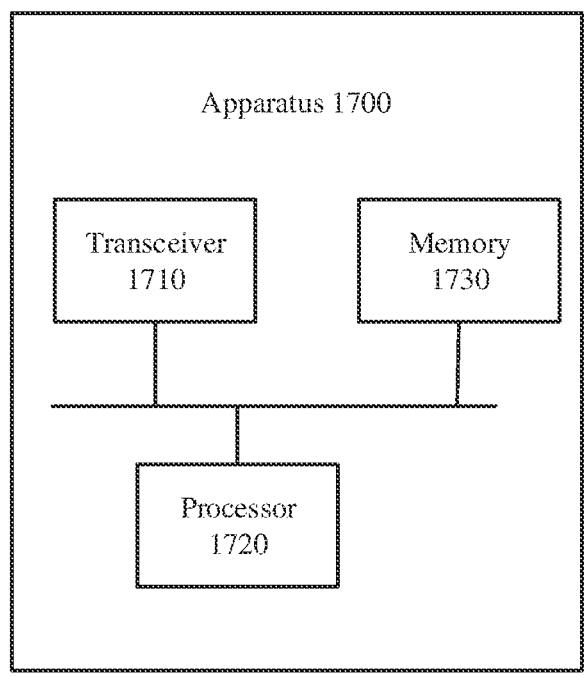
FIG. 17 is a schematic diagram of a structure of an apparatus for sensing measurement according to another embodiment of this application.

FIG. 17 is a schematic diagram of a structure of an apparatus for sensing measurement according to another embodiment of this application. An apparatus 1700 shown in FIG. 17 may be the second device shown in FIG. 1, or a module (for example, a chip) used in the second device. As shown in FIG. 17, the apparatus 1700 may include a transceiver 1710, a processor 1720, and a memory 1730.

FIG. 17 shows only one memory and one processor. In an actual product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 1710, the processor 1720, and the memory 1730 communicate with each other through an internal connection path and transfer a control signal and/or a data signal.

Specifically, the processor 1720 is configured to generate an indication frame, where the indication frame is used for indicating a spatial mapping matrix.

The transceiver 1710 is configured to send the indication frame.

For a specific working process and beneficial effects of the apparatus 1700, refer to related descriptions in the foregoing method embodiment.

The transceiver in the embodiments of this application may also be referred to as a transceiver unit, a transceiver machine, a transceiver apparatus, or the like. The processor may also be referred to as a processing unit, a processing board, a processing module, a processing apparatus, or the like. Optionally, a component that is in the transceiver and that is configured to implement a receiving function may be considered as a receiving unit, and a component that is in the transceiver and that is configured to implement a sending function may be considered as a sending unit. In other words, the transceiver includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

The memory described in the embodiments of this application is configured to store computer instructions and a parameter for running the processor.

The processor in the embodiments of this application may be an integrated circuit chip, and has a signal processing capability. In an implementation process, the steps in the foregoing methods may be completed by using a hardware integrated logical circuit in the processor, or by using instructions in a form of software. The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and the logic block diagrams that are disclosed in the embodiments of this application may be implemented or performed. The general-purpose processor may be a microprocessor, or the processor may be any conventional processor or the like. The steps of the methods disclosed with reference to the embodiments of this application may be directly presented as being performed and completed by a hardware decoding processor, or performed and completed by a combination of hardware and a software module in a decoding processor. The software module may be located in a mature storage medium in the art, for example, a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

Sequence numbers of the processes do not mean execution sequences in various embodiments of this application. The execution sequences of the processes should be determined based on functions and internal logic of the processes, and should not be construed as any limitation on the implementation processes of the embodiments of this application.

In addition, a specific structure of an execution body of the method provided in the embodiments of this application is not specially limited in the embodiments of this application, provided that a program that records code of the method provided in the embodiments of this application can be run to perform communication according to the method provided in the embodiments of this application. For example, the method provided in the embodiments of this application may be performed by the AP or the STA, or a functional module that can invoke and execute the program in the AP or the STA.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

It should be understood that the terms "system" and "network" in this specification may usually be used interchangeably. The term "and/or" in this application describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

All or some of the foregoing embodiments may be implemented by using software, hardware, firmware, or any combination thereof. When the software is used to implement the embodiments, the embodiments may be implemented entirely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

A person of ordinary skill in the art may be aware that the units and the algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code, for example, a USB flash drive, a removable hard disk, a read-only memory (ROM), a random access memory (RAM), a magnetic disk, or an optical disc.

The foregoing descriptions are merely non-limiting examples of specific implementations and are not intended to limit the protection scope, which is intended to cover any variation or replacement readily determined by a person of ordinary skill in the art. Therefore, the claims shall define the protection scope.

What is claimed is:

1. A method for sensing measurement performed by a first device, comprising:
   receiving, by the first device, an indication frame, wherein the indication frame indicates one spatial mapping matrix to be used by a second device to send a measurement frame or multiple spatial mapping matrices to be used by the second device in different channel bandwidths and/or different numbers of space time streams;
   receiving, by the first device, the measurement frame from the second device,
   obtaining, by the first device, a channel estimation result based on the measurement frame and a spatial mapping matrix indicated by the indication frame, the spatial mapping matrix being used by the second device to send the measurement frame or being determined based on a channel bandwidth and/or a number of space time streams carried in the measurement frame; and
   determining, by the first device, channel state information based on the spatial mapping matrix and the channel estimation result.

2. The method according to claim 1, wherein the indication frame comprises a spatial mapping matrix field indicating the spatial mapping matrix.

3. The method according to claim 2, wherein the spatial mapping matrix field comprises at least one of a column number field, a row number field, a quantization bit number field, or a channel bandwidth field, wherein the column number field indicates a number of columns of the spatial mapping matrix, the row number field indicates a number of rows of the spatial mapping matrix, the quantization bit number field indicates a number of quantization bits of the spatial mapping matrix, and the channel bandwidth field indicates a channel bandwidth.

4. The method according to claim 2, wherein the spatial mapping matrix field comprises an index of the spatial mapping matrix.

5. The method according to claim 2, wherein the indication frame comprises a spatial mapping matrix element, and the spatial mapping matrix element comprises the spatial mapping matrix field and at least one of an element ID field indicating an element identity (ID), an element length field indicating a length of the spatial mapping matrix field, or an element ID extension field indicating element ID extension.

6. The method according to claim 1, further comprising:
   Before receiving the indication frame, sending, by the first device, a request frame to the second device, wherein the request frame requests to feed back the spatial mapping matrix.

7. The method according to claim 6, wherein the request frame is a trigger frame, the trigger frame comprises a first trigger type for triggering to feed back the spatial mapping matrix.

8. The method according to claim 7, wherein the indication frame comprises at least one of a beacon frame, a null data packet announcement (NDPA) frame, a response frame for the trigger frame, or a dedicated illuminating frame for obtaining the channel estimation result.

9. The method according to claim 1, wherein the measurement frame is a null data packet (NDP) frame or a dedicated illuminating frame.

10. A method for sensing measurement, comprising:
    receiving an indication frame, wherein the indication frame indicates a spatial mapping matrix, and
    determining channel state information based on the spatial mapping matrix and a channel estimation result,
    wherein the indication frame comprises a spatial mapping, matrix field indicating the spatial mapping matrix,
    wherein the spatial mapping matrix field comprises at least one of a column number field, a row number field, a quantization bit number field, or a channel bandwidth field, wherein the column number field indicates a number of columns of the spatial mapping matrix, the row number field indicates a number of rows of the spatial mapping matrix, the quantization bit number field indicates a number of quantization bits of the spatial mapping matrix, and the channel bandwidth field indicates a channel bandwidth, and
    wherein the spatial mapping matrix field further comprises a matrix field indicating bit sequences of the spatial mapping matrix after quantization.

11. A method for sensing measurement performed by a second device, comprising:
    generating, by the second device, an indication frame, wherein the indication frame indicates one spatial mapping matrix to be used by the second device to send a measurement frame or multiple spatial mapping matrices to be used by the second device in different channel bandwidths and/or different numbers of space time streams;
    sending, by the second device, the measurement frame to a first device so that a channel estimation result can be obtained by the first device based on the measurement frame and a spatial mapping matrix indicated by the indication frame, the spatial mapping matrix being used by the second device to send the measurement frame or being determined based on a channel bandwidth and/or a number of space time streams carried in the measurement frame; and
    sending, by the second device, the indication frame to the first device so that the first device can determine channel state information based on the spatial mapping matrix and the channel estimation result.

12. The method according to claim 11, wherein the indication frame comprises a spatial mapping matrix field indicating the spatial mapping matrix.

13. The method according to claim 12, wherein the spatial mapping matrix field comprises at least one of a column number field, a row number field, a quantization bit number field, or a channel bandwidth field, wherein the column number field indicates a number of columns of the spatial mapping matrix, the row number field indicates a number of rows of the spatial mapping matrix, the quantization bit number field indicates a number of quantization bits of the spatial mapping matrix, and the channel bandwidth field indicates a channel bandwidth.

14. The method according to claim 12, wherein the spatial mapping matrix field comprises an index of the spatial mapping matrix.

15. The method according to claim 12, wherein the indication frame comprises a spatial mapping matrix element, and the spatial mapping matrix element comprises the spatial mapping matrix field and at least one of an element ID field indicating an element identity (ID), an element length field indicating a length of the spatial mapping matrix field, or an element ID extension field indicating element ID extension.

16. The method according to claim 11, wherein before the sending the indication frame, the method further comprises:
receiving a request frame requesting to feed back the spatial mapping matrix.

17. The method according to claim 16, wherein the request frame is a trigger frame, the trigger frame comprises a first trigger type for triggering to feed back the spatial mapping matrix.

18. The method according to claim 17, wherein the indication frame comprises at least one of a beacon frame, a null data packet announcement (NDPA) frame, a response frame for the trigger frame, or a dedicated illuminating frame for obtaining the channel estimation result.

19. A method for sensing measurement, comprising:
generating, an indication frame, wherein the indication frame indicates a spatial mapping matrix; and
sending the indication frame to a network device so that the network device can determine channel state information based on the spatial mapping matrix and a channel estimation result,
wherein the indication frame comprise a spatial mapping matrix field indicating the spatial mapping matrix,
wherein the spatial mapping matrix field comprises at least one of a column number field, a row number field, a quantization bit number field, or a channel bandwidth field, wherein the column number field indicates a number of columns of the spatial mapping matrix, the row number field indicates a number of rows of the spatial mapping matrix, the quantization bit number field indicates a number of quantization bits of the spatial mapping matrix, and the channel bandwidth field indicates a channel bandwidth,
wherein the spatial mapping matrix field further comprises a matrix field, and the matrix field indicates bit sequences of the spatial mapping matrix after quantization.

20. A chip, wherein the chip comprises a processor; and the processor is connected to a memory storing a software program that, when executed by the processor, cause the chip to perform operations comprising:
receiving an indication frame from a network device, wherein the indication frame indicates one spatial mapping matrix to be used by the network device to send a measurement frame or multiple spatial mapping matrices to be used by the network device in different channel bandwidths and/or different numbers of space time streams;
receiving the measurement frame from the network device,
obtaining a channel estimation result based on the measurement frame and a spatial mapping matrix indicated by the indication frame, the spatial mapping matrix being used by the network device to send the measurement frame or being determined based on a channel bandwidth and/or a number of space time streams carried in the measurement frame; and
determining channel state information based on the spatial mapping matrix and the channel estimation result.

21. A non-transitory computer-readable storage medium, storing a computer program including instructions that, when executed by an apparatus for sensing measurement, cause the apparatus to perform operations comprising:
receiving an indication frame from a network device, wherein the indication frame indicates one spatial mapping matrix to be used by the network device to send a measurement frame or multiple spatial mapping matrices to be used by the network device in different channel bandwidths and/or different numbers of space time streams;
receiving the measurement frame from the network device,
obtaining a channel estimation result based on the measurement frame and a spatial mapping matrix indicated by the indication frame, the spatial mapping matrix being used by the network device to send the measurement frame or being determined based on a channel bandwidth and/or a number of space time streams carried in the measurement frame; and
determining channel state information based on the spatial mapping matrix and the channel estimation result.

* * * * *

UNITED STATES PATENT AND TRADEMARK OFFICE
CERTIFICATE OF CORRECTION

PATENT NO. : 11,831,574 B2
APPLICATION NO. : 17/692292
DATED : November 28, 2023
INVENTOR(S) : Chenchen Liu et al.

It is certified that error appears in the above-identified patent and that said Letters Patent is hereby corrected as shown below:

In the Claims

Column 23, Claim 19, Line 38, change "comprise" to "comprises".

Signed and Sealed this
Twenty-sixth Day of March, 2024

Katherine Kelly Vidal
*Director of the United States Patent and Trademark Office*